(12) United States Patent
Qiu et al.

(10) Patent No.: US 12,165,488 B2
(45) Date of Patent: Dec. 10, 2024

(54) MULTI-STATE TRIGGERED SYSTEM AND METHOD FOR REMOTE AUTOMATIC MONITORING AND EARLY WARNING OF LANDSLIDE MASS

(71) Applicant: Northwest University, Xi'an (CN)

(72) Inventors: Haijun Qiu, Xi'an (CN); Wen Nie, Xi'an (CN); Chi Du, Xi'an (CN); Dongdong Yang, Xi'an (CN); Zijing Liu, Xi'an (CN)

(73) Assignee: Northwest University, Xi'an (CN)

( * ) Notice: Subject to any disclaimer, the term of this patent is extended or adjusted under 35 U.S.C. 154(b) by 173 days.

(21) Appl. No.: 17/826,570

(22) Filed: May 27, 2022

(65) Prior Publication Data

US 2022/0392326 A1   Dec. 8, 2022

(30) Foreign Application Priority Data

May 27, 2021   (CN) .......................... 202110583887.1

(51) Int. Cl.
| | |
|---|---|
| *G08B 21/10* | (2006.01) |
| *G01V 1/00* | (2006.01) |
| *G01V 1/01* | (2024.01) |
| *G01W 1/14* | (2006.01) |
| *H04W 4/90* | (2018.01) |

(52) U.S. Cl.
CPC ............. *G08B 21/10* (2013.01); *G01V 1/006* (2013.01); *G01V 1/01* (2024.01); *G01W 1/14* (2013.01); *H04W 4/90* (2018.02)

(58) Field of Classification Search
CPC .......... G08B 21/10; G01V 1/006; G01V 1/01; G01W 1/14; G01W 2203/00; G01W 1/10; H04W 4/90; G01B 11/02
USPC ............................................ 702/15; 340/690
See application file for complete search history.

(56) References Cited

U.S. PATENT DOCUMENTS

| | | | |
|---|---|---|---|
| 2012/0206258 A1* | 8/2012 | Ramesh | .................... G01V 1/01 340/539.22 |
| 2023/0046111 A1* | 2/2023 | Ramesh | ................. G01V 1/181 |

* cited by examiner

*Primary Examiner* — An T Nguyen
(74) *Attorney, Agent, or Firm* — Morse, Barnes-Brown & Pendleton, P.C.; Martin Z. Zhang, Esq.

(57) ABSTRACT

The present disclosure belongs to the technical field of monitoring landslide mass geological disasters, and discloses a multi-state triggered system and method for remote automatic monitoring and early warning of a landslide mass. The multi-state triggered system for remote automatic monitoring and early warning of a landslide mass includes: a landslide mass monitoring module, a data preprocessing module, a communication module, a central control module, a displacement monitoring module, a stability evaluation module, an abnormality early warning module, a power supply module, a data storage module and a display update module. In the present disclosure, through the displacement monitoring module and the stability evaluation module, long-term automatic monitoring of the landslide mass can be realized, and the displacement change of the landslide mass can be grasped so as to evaluate the stability of the landslide mass.

17 Claims, 4 Drawing Sheets

MULTI-STATE TRIGGERED SYSTEM AND METHOD FOR REMOTE AUTOMATIC MONITORING AND EARLY WARNING OF LANDSLIDE MASS

CROSS REFERENCE TO RELATED APPLICATION

This patent application claims the benefit and priority of Chinese Patent Application No. 202110583887.1, filed on May 27, 2021, the disclosure of which is incorporated by reference herein in its entirety as part of the present application.

TECHNICAL FIELD

The present disclosure belongs to the technical field of monitoring landslide mass geological disasters, and particularly relates to a multi-state triggered system and method for remote automatic monitoring and early warning of a landslide mass.

BACKGROUND ART

Landslides are one of the most pervasive hazards in the world, causing thousands of fatalities and billions of dollars in damages each year. They occur more frequently in rainy seasons of basins and hilly areas. Existing landslide monitoring devices use displacement sensors and on-site alarm devices to alarm the landslide, which has some disadvantages, that is, an alarm is given only when the landslide occurs, and the landslide cannot be predicted. When the landslide occurs at night or during rest, it is very easy to threaten people's lives.

In landslide monitoring, a plurality of monitoring points need to be set up, and the monitoring points are widely distributed, large in number, long in distance, limited in communication mode, long in construction period, difficult to work and high in operating cost, thereby being not inconvenient for large-scale use. At present, technical methods for landslide monitoring mainly include manual measurement, global positioning system (GPS) measurement and geological disaster sensor measurement. The manual measurement has the disadvantages of low degree of automation, high risk, and difficulty in real-time monitoring of the landslide. The GPS measurement has the disadvantages of low accuracy and high cost. The geological disaster sensor measurement method has the characteristics of high accuracy, low cost and effective combination. A wireless transmission technology can realize the real-time and high-accuracy acquisition of landslide state information, so it is widely used in landslide monitoring. However, the current data acquisition terminal still lacks a special design for China's national conditions, and cannot accurately monitor external rainfall, water level and other information, which is not conducive to the commander's accurate grasp of geographical information. In the event of a disaster, timely and careful arrangements should be made to do a good job in flood control and disaster reduction. Moreover, the current monitoring technology is not high in accuracy and is difficult for later maintenance. Therefore, there is an urgent need for a new multi-state triggered system for remote automatic monitoring and early warning of a landslide mass.

Through the above analysis, the problems and defects in the prior art are:
(1) The existing landslide monitoring devices give an alarm only when the landslide occurs and cannot predict the landslide. When the landslide occurs at night or during rest, it is very likely to threaten people's lives.

(2) In existing landslide monitoring, a plurality of monitoring points need to be set up, and the monitoring points are large in number, long in distance, limited in communication mode, long in construction period, difficult to work and high in operating cost, thereby being not inconvenient for large-scale use.

(3) The manual measurement has the disadvantages of low degree of automation, high risk, and difficulty in real-time monitoring of the landslide. The GPS measurement has the disadvantages of low accuracy and high cost. However, the geological disaster sensor measurement method has the characteristics of high accuracy and low cost.

(4) At present, no data acquisition terminal capable of realizing high-accuracy and accurate monitoring of external rainfall, water level and other information has been specially designed for China's national conditions, which is not conducive to the commander's accurate grasp of geographical information and timely and careful arrangements for flood control and disaster reduction in the event of a disaster.

(5) The current monitoring technology is not high in accuracy and is difficult in later maintenance.

SUMMARY

Aiming at the problems existing in the prior art, the present disclosure provides a multi-state triggered system and method for remote automatic monitoring and early warning of a landslide mass.

The present disclosure is realized in this way: the multi-state triggered system for remote automatic monitoring and early warning of a landslide mass includes:

a landslide mass monitoring module, a data preprocessing module, a communication module, a central control module, a displacement monitoring module, a stability evaluation module, an abnormality early warning module, a power supply module, a data storage module and a display update module.

The landslide mass monitoring module is connected with the central control module, and configured to monitor the landslide mass in real time through two sets of monitoring devices arranged crosswise at an angle of 90 degrees, and acquire original monitoring data messages of the landslide mass;

the data preprocessing module is connected with the central control module, and configured to preprocess the acquired original monitoring data messages of the landslide mass through a data preprocessing program, and acquire a monitoring data set of the landslide mass;

the communication module is connected with the central control module, and configured to acquire weather condition data through a wireless data transceiver to complete rainfall regularity analysis, and send the preprocessed monitoring data set of the landslide mass to a central processing unit (CPU);

the central control module is connected with the landslide mass monitoring module, the data preprocessing module, the communication module, the displacement monitoring module, the stability evaluation module, the abnormality early warning module, the power supply module, the data storage module and the display update module, and configured to coordinately control the normal operation of each module of the multi-state triggered system for remote automatic monitoring and early warning of a landslide mass through a dual-core controller based on a digital signal processor (DSP) and a field programmable gate array (FPGA);

the displacement monitoring module is connected with the central control module, and configured to monitor the displacement change of the landslide mass in real time through a displacement monitoring device;

the stability evaluation module is connected with the central control module, and configured to evaluate the stability of the landslide mass according to the displacement change of the landslide mass through a stability evaluation program;

the abnormality early warning module is connected with the central control module, and configured to perform early warning notification for an abnormal displacement change of the landslide mass through an acousto-optical early warning device;

the power supply module is connected with the central control module, and configured to supply power for the multi-state triggered system for remote automatic monitoring and early warning of a landslide mass through a power supply device;

the data storage module is connected with the central control module, and configured to store the acquired original monitoring data messages of the landslide mass, monitoring data set of the landslide mass, displacement change of the landslide mass, stability evaluation information of the landslide mass and abnormality early warning notification information through a cloud database server; and the display update module is connected with the central control module, and configured to update and display the real-time data of the acquired original monitoring data messages of the landslide mass, monitoring data set of the landslide mass, displacement change of the landslide mass, stability evaluation information of the landslide mass and abnormality early warning notification information through a display.

Further, the process of acquiring the weather condition data through the wireless data transceiver to complete rainfall regularity analysis in the communication module includes:

(1) acquiring landslide displacement and groundwater level monitoring data under different intensities of rainfall;

(2) drawing a rainfall-groundwater level-landslide displacement curve according to the landslide displacement and groundwater level monitoring data under different intensities of rainfall; and (3) completing rainfall regularity analysis according to the rainfall-groundwater level-landslide displacement curve.

Further, said drawing a rainfall-groundwater level-landslide displacement curve according to the landslide displacement and groundwater level monitoring data under different intensities of rainfall includes:

$$R = \frac{\sum_{i=1}^{n}(\omega_{t+1}-\omega_{t})/\max(\Delta\omega)}{\sum_{i=1}^{n}(s_{t+1}-s_{t})/\max(\Delta s)};$$

where R represents a local correlation coefficient between a rainfall curve and a landslide displacement, $\omega_{t+1}-\omega_t$ represents a rainfall from moment t to moment t+1, $s_{t+1}-s_t$ represents a landslide displacement from moment t to moment t+1, $\max(\Delta\omega)$ and $\max(\Delta s)$ represent the maximum amplitudes of rainfall and landslide displacement factors per unit time in a time period, and the closer the R is to 1, the stronger the correlation between the rainfall and the landslide displacement, thereby completing the rainfall regularity analysis.

Further, the process of sending the preprocessed monitoring data set of the landslide mass to the CPU through the wireless data transceiver in the communication module includes:

(1) calculating a data transmission success probability, where a theoretical calculation value of a one-time transmission success rate $P_N$ of a long message with a length of N Beidou data packets is as follows:

$$P_N = \bar{p} \cdot N;$$

where $\bar{p}$ represents a transmission success rate of Beidou data packets, which is defined as follows:

$$\bar{p} = \frac{R_{\mathit{eff}}}{S_{\mathit{eff}}};$$

where $S_{\mathit{eff}}$ represents a total number of valid Beidou data packets sent, and $R_{\mathit{eff}}$ represents a total number of valid Beidou data packets received; and (2) calculating a data transmission delay, where an average transmission delay of Beidou short message communication is calculated by the following formula:

$$\bar{\tau} = \frac{1}{n}\sum_{i=1}^{n}(T_2^i - T_1^i);$$

where n represents a total number of Beidou data packets received and sent in a centralized manner, $T_1^i$ represents a sending time of an ith Beidou data packet, and $T_2^i$ represents a receiving time of the ith Beidou data packet.

Further, the process of coordinately controlling the normal operation of each module of the multi-state triggered system for remote automatic monitoring and early warning of a landslide mass through a dual-core controller based on a DSP and an FPGA in the central control module includes:

(1) sending an instruction to an auxiliary processor FPGA through a main processor DSP;

(2) performing communication with an analog to digital (A/D) chip through the auxiliary processor FPGA to read in a test signal;

(3) processing the read-in test signal through the auxiliary processor FPGA, and transmitting the processed test signal to the DSP; and (4) acquiring a corresponding control method according to the processed test signal through the main processor DSP, so as to coordinately control the system for remote automatic monitoring and early warning of a landslide mass.

Further, the process of monitoring the displacement change of the landslide mass in real time through a displacement monitoring device in the displacement monitoring module includes:

(1) automatically monitoring the change of inclination angles of panels of the displacement monitoring device through an inclination angle sensor mounted on the displacement monitoring device;

(2) monitoring horizontal displacements of a vertical reflection panel and an inclined reflection panel in real time through a laser displacement sensor mounted on the displacement monitoring device; and (3) determining a moving orientation and velocity of the landslide mass according to the change of the displacements and the inclination angles.

Further, the panels of the displacement monitoring device include the inclined reflection panel and the vertical reflection panel which form an included angle α therebetween, the laser displacement sensor is directly opposite to the vertical reflection panel, the laser sensor and a horizontal direction form an included angle β therebetween, and β and α are supplementary angles to each other.

Further, the process of determining a moving orientation and velocity of the landslide mass according to the change of the displacements and the inclination angles includes:

assuming that at the beginning and end of a monitoring time period, horizontal inclination angles monitored by the inclination angle sensor are $\alpha_0$ and $\alpha_1$ respectively, horizontal displacements of the vertical reflection panel are $\kappa_0$ and $\kappa_1$ respectively, and displacements of the inclined reflection panel are $d_0$ and $d_i$ respectively, establishing a three-dimensional coordinate system by taking a laser spot on the inclined reflection panel at the beginning of the time period as an original point, taking a horizontal direction of an axis of the landslide mass as an x axis, taking a vertical direction as a y axis, and taking a direction perpendicular to the x axis and the y axis as a z axis, where the landslide mass along a monitoring direction of the landslide axis has a displacement d, and the landslide mass at a monitoring point has a horizontal displacement $d_x$, a vertical displacement $d_y$, and a lateral displacement $d_z$;

in a plane coordinate system composed of the x axis and the y axis, when $\alpha_0=\alpha_1$, the inclined reflection panel moves in parallel, the laser spot starts from the original point and moves from bottom to top along a straight line on the inclined reflection panel, at the end of the time period, the laser spot is located at $B(x_1,y_1)$, and the location point of the laser spot at the beginning of the time period moves to $A(x_0,y_0)$;

(1) on the axis of the landslide mass, a landslide displacement in an inclined monitoring direction is:

$$d=d_1-d_0;$$

(2) at the monitoring point, a horizontal displacement is calculated as:

$$d_x=\kappa_1-\kappa_0;$$

(3) a vertical displacement is calculated as:

$$x_1=d\cos\beta x_0=d_x;$$

$$y_1=d\sin\beta tg(\pi/2-\beta)=(y_0-y_1)/(x_0-x_1);$$

$$y_0=y_1+(x_0-x_1)tg(\pi/2-\alpha);$$

$$y_0=d\sin\beta+(d_x-d\cos\beta)tg(\pi/2-\beta);$$

that is, $d_y=d\sin\beta+(d_x-d\cos\beta)tg(\pi/2-\beta)$; and (4) a lateral displacement is calculated as:

in a plane coordinate system composed of the z axis and the y axis, on a lateral reflection panel, a laser spot moves from bottom to top along a straight line, at the end of the time period, the laser spot is located at $B(z_1,y_1)$, and the location point of the laser spot at the beginning of the time period moves to $A(z_0,y_0)$; in this way, assuming that a distance difference between 2 adjacent times of measurement in a lateral direction is dd, then:

$$z_1=dd\cos\Phi;$$

$$y_1=d\sin\beta tg(\pi/2-\Phi)=(y_0-y_1)/(z_0-z_1);$$

$$z_0-z_1=(y_0-y_1)/tg(\pi/2-\Phi);$$

$$z_0=(y_0-y_1)/tg(\pi/2-\Phi)+z_1;$$

that is, $d_z=(d_y-dd\sin\Phi)/tg(\pi/2-\Phi)+dd\cos\Phi$.

Another objective of the present disclosure is to provide a computer program product stored on a computer-readable medium, including a computer-readable program, where when the computer-readable program is executed on an electronic device, a user input interface is provided so as to apply the multi-state triggered system for remote automatic monitoring and early warning of a landslide mass.

Another objective of the present disclosure is to provide a computer-readable storage medium in which an instruction is stored, where when the instruction is executed on a computer, the computer applies the multi-state triggered system for remote automatic monitoring and early warning of a landslide mass.

In combination with all the above-mentioned technical solutions, the present disclosure has the following advantages and positive effects: in the multi-state triggered system for remote automatic monitoring and early warning of a landslide mass provided by the present disclosure, through the displacement monitoring module and the stability evaluation module, long-term automatic monitoring of the landslide mass can be realized, and the displacement change of the landslide mass can be grasped so as to evaluate the stability of the landslide mass. In the present disclosure, by monitoring the relative displacement of the landslide mass, the stability and deformation stage of the landslide mass can be sufficiently reflected, and an important basis can be provided for defense decision-making of the landslide mass. In the present disclosure, through the communication module, the data transmission success probability and data transmission delay of a Beidou communication system are calculated, and in combination with the matching probability of the data collected on site at a landslide monitoring point and the data received by a monitoring center, a reliability test of a data transmission system can be realized.

BRIEF DESCRIPTION OF THE DRAWINGS

To describe the technical solutions in embodiments of the present disclosure more clearly, the following briefly describes the accompanying drawings that need to be used in the embodiments. Apparently, the accompanying drawings in the following description show merely some embodiments of the present disclosure, and a person of ordinary skill in the art may derive other drawings from these accompanying drawings without creative efforts.

In the figure: 1. landslide mass monitoring module; 2. data preprocessing module; 3. communication module; 4. central control module; 5. displacement monitoring module; 6. stability evaluation module; 7. abnormality early warning module; 8. power supply module; 9. data storage module; 10. display update module.

Figure 2:
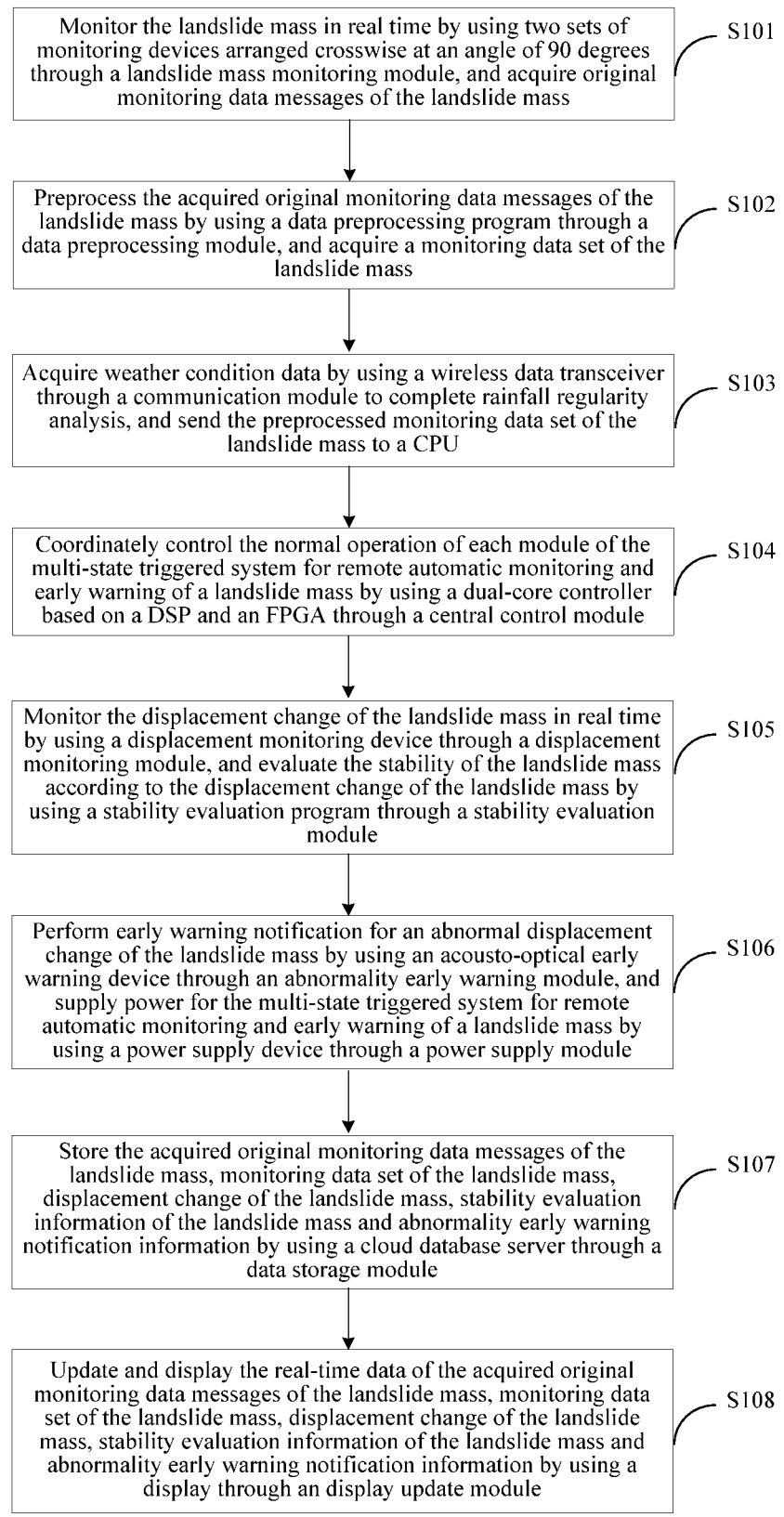

FIG. 2 is a flow diagram of a multi-state triggered method for remote automatic monitoring and early warning of a landslide mass provided by embodiment 1 of the present disclosure.

Figure 3:
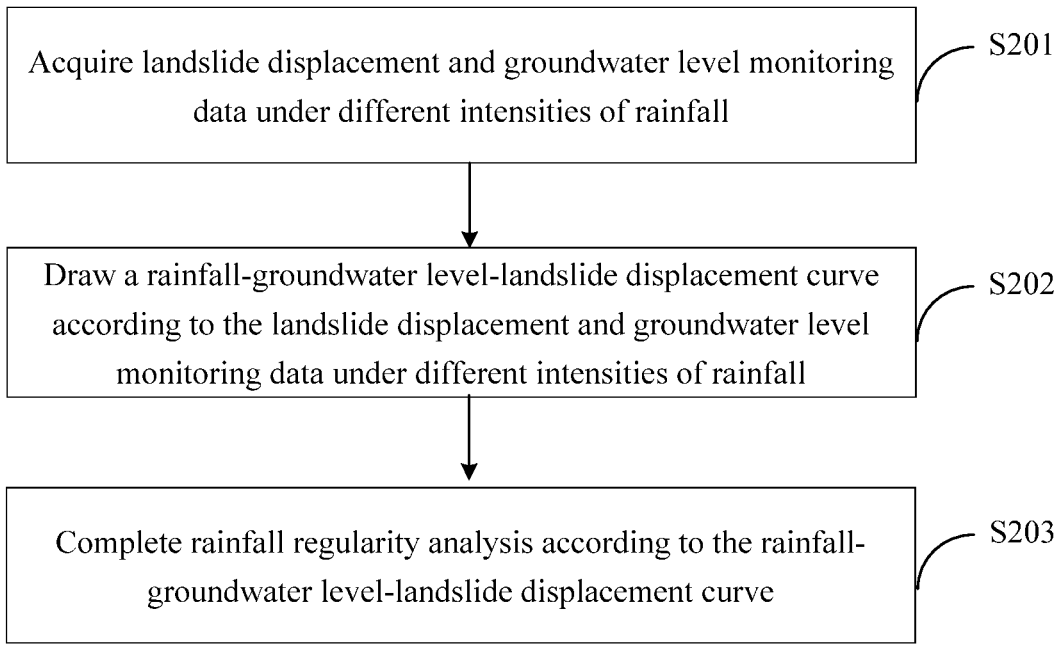

FIG. 3 is a flow diagram of a method for acquiring weather condition data by using a wireless data transceiver through a communication module to complete rainfall regularity analysis provided by an embodiment of the present disclosure.

Figure 4:
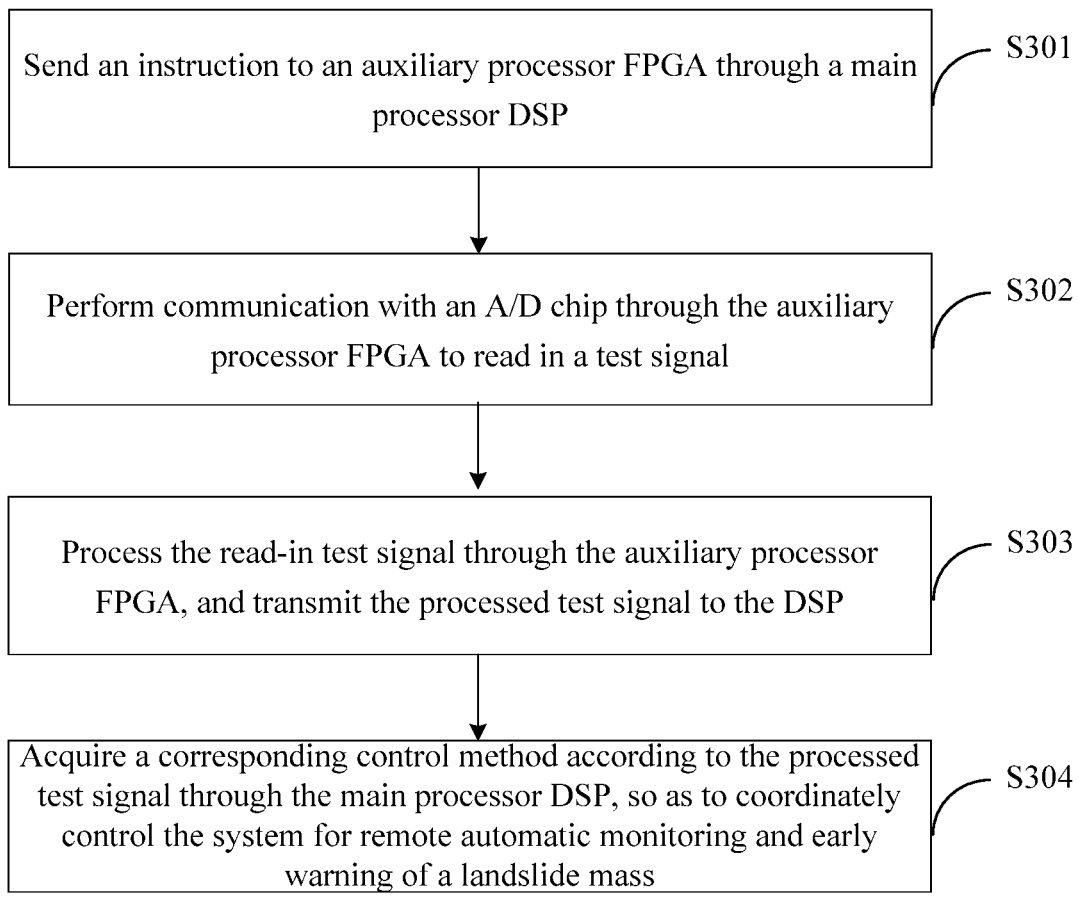

FIG. 4 is a flow diagram of a method for coordinately controlling the normal operation of each module of the multi-state triggered system for remote automatic monitoring and early warning of a landslide mass by using a dual-core controller based on a DSP and an FPGA through a central control module provided by an embodiment of the present disclosure.

Figure 5:
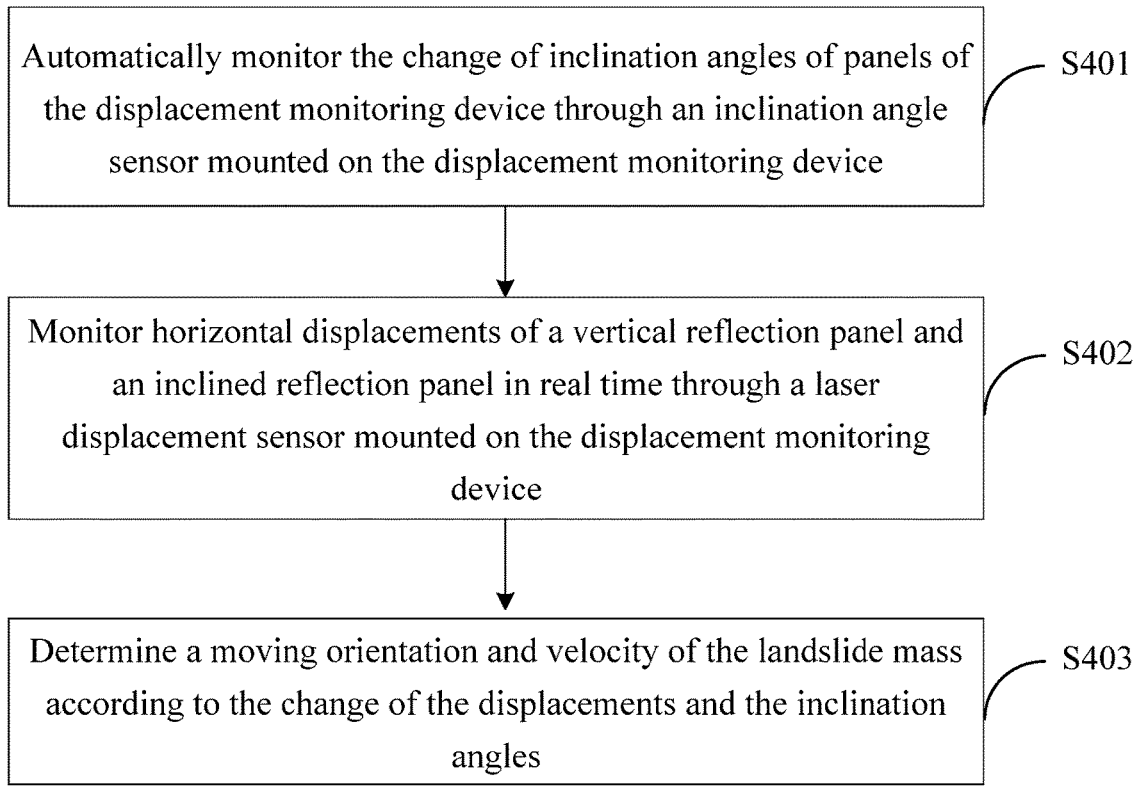

FIG. 5 is a flow diagram of a method for monitoring the displacement change of a landslide mass in real time by using a displacement monitoring device through the displacement monitoring module provided by an embodiment of the present disclosure.

Figure 6:
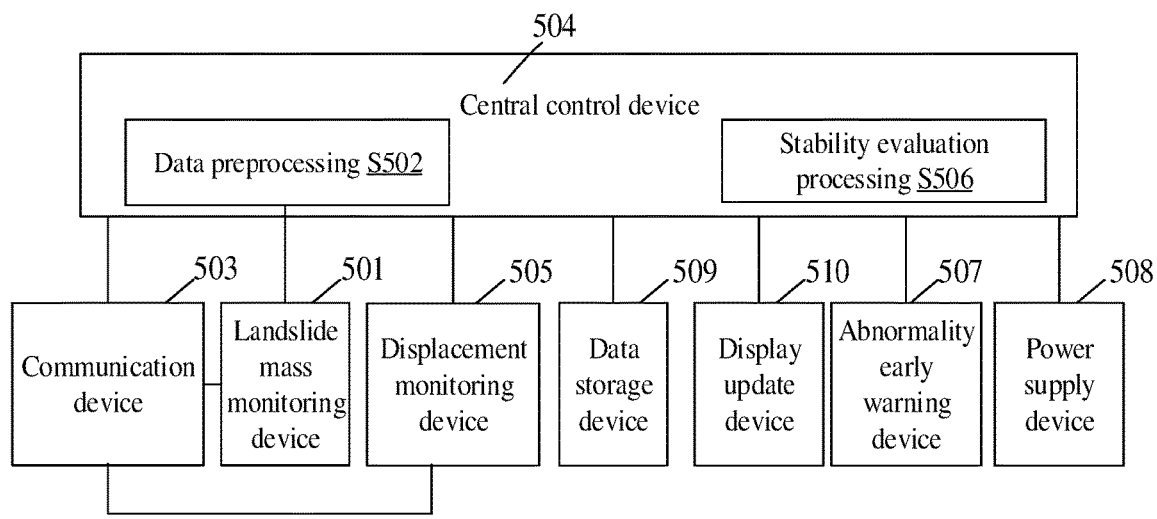

FIG. 6 is a structural block diagram of a multi-state triggered system for remote automatic monitoring and early warning of a landslide mass provided by embodiment 2 of the present disclosure.

DETAILED DESCRIPTION OF THE EMBODIMENTS

To make the objectives, technical solutions and advantages of the present disclosure clearer and more comprehensible, the present disclosure will be further described below in detail in conjunction with embodiments. It should be appreciated that the specific embodiment described herein is only intended to explain the present disclosure and is not intended to limit the present disclosure.

Aiming at the problems existing in the prior art, the present disclosure provides a multi-state triggered system and method for remote automatic monitoring and early warning of a landslide mass. The present disclosure will be described in detail below with reference to the accompanying drawings.

Figure 1:
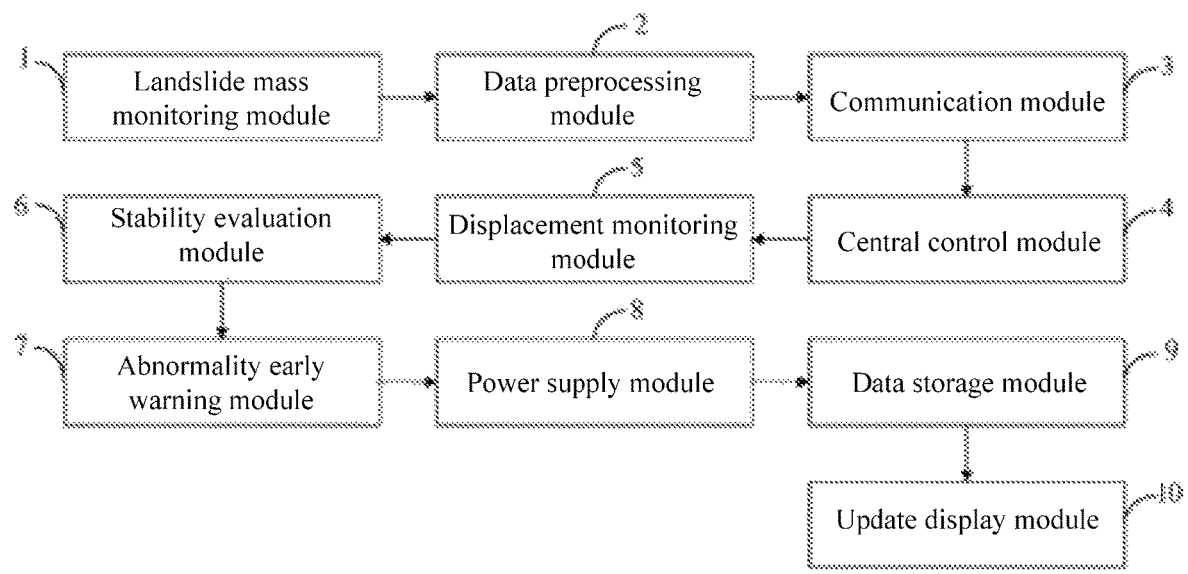
FIG. 1 is a structural block diagram of a multi-state triggered system for remote automatic monitoring and early warning of a landslide mass provided by embodiment 1 of the present disclosure.

As shown in FIG. 1, the multi-state triggered system for remote automatic monitoring and early warning of a landslide mass provided by an embodiment of the present disclosure includes: a landslide mass monitoring module 1, a data preprocessing module 2, a communication module 3, a central control module 4, a displacement monitoring module 5, a stability evaluation module 6, an abnormality early warning module 7, a power supply module 8, a data storage module 9 and a display update module 10.

The landslide mass monitoring module 1 is connected with the central control module 4, and configured to monitor the landslide mass in real time through two sets of monitoring devices arranged crosswise at an angle of 90 degrees, and acquire original monitoring data messages of the landslide mass;

the data preprocessing module 2 is connected with the central control module 4, and configured to preprocess the acquired original monitoring data messages of the landslide mass through a data preprocessing program, and acquire a monitoring data set of the landslide mass;

the communication module 3 is connected with the central control module 4, and configured to acquire weather condition data through a wireless data transceiver to complete rainfall regularity analysis, and send the preprocessed monitoring data set of the landslide mass to a CPU;

the central control module 4 is connected with the landslide mass monitoring module 1, the data preprocessing module 2, the communication module 3, the displacement monitoring module 5, the stability evaluation module 6, the abnormality early warning module 7, the power supply module 8, the data storage module 9 and the display update module 10, and configured to coordinately control the normal operation of each module of the multi-state triggered system for remote automatic monitoring and early warning of a landslide mass through a dual-core controller based on a DSP and an FPGA;

the displacement monitoring module 5 is connected with the central control module 4, and configured to monitor the displacement change of the landslide mass in real time through a displacement monitoring device;

the stability evaluation module 6 is connected with the central control module 4, and configured to evaluate the stability of the landslide mass according to the displacement change of the landslide mass through a stability evaluation program;

the abnormality early warning module 7 is connected with the central control module 4, and configured to perform early warning notification for an abnormal displacement change of the landslide mass through an acoustic-optical early warning device;

the power supply module 8 is connected with the central control module 4, and configured to supply power for the multi-state triggered system for remote automatic monitoring and early warning of a landslide mass through a power supply device;

the data storage module 9 is connected with the central control module 4, and configured to store the acquired original monitoring data messages of the landslide mass, monitoring data set of the landslide mass, displacement change of the landslide mass, stability evaluation information of the landslide mass and abnormality early warning notification information through a cloud database server; and the display update module 10 is connected with the central control module 4, and configured to update and display the real-time data of the acquired original monitoring data messages of the landslide mass, monitoring data set of the landslide mass, displacement change of the landslide mass, stability evaluation information of the landslide mass and abnormality early warning notification information through a display.

As shown in FIG. 2, the multi-state triggered method for remote automatic monitoring and early warning of a landslide mass provided by an embodiment of the present disclosure includes the following steps:

S101: the landslide mass is monitored in real time by using two sets of monitoring devices arranged crosswise at an angle of 90 degrees through the landslide mass monitoring module, and original monitoring data messages of the landslide mass are acquired;

S102: the acquired original monitoring data messages of the landslide mass are preprocessed by using the data preprocessing program through the data preprocessing module, and a monitoring data set of the landslide mass is acquired;

S103: weather condition data is acquired by using the wireless data transceiver through the communication module to complete rainfall regularity analysis, and the preprocessed monitoring data set of the landslide mass is sent to the CPU;

S104: the normal operation of each module of the multi-state triggered system for remote automatic monitoring and early warning of a landslide mass is coordinately controlled by using the dual-core controller based on a DSP and an FPGA through the central control module;

S105: the displacement change of the landslide mass is monitored in real time by using the displacement monitoring device through the displacement monitoring module, and the stability of the landslide mass is evaluated according to the displacement change of the landslide mass by using the stability evaluation program through the stability evaluation module;

S106: early warning notification is performed for an abnormal displacement change of the landslide mass by using the acoustic-optical early warning device through the abnormality early warning module, and power is supplied for the multi-state triggered system for remote automatic monitoring and early warning of a landslide mass by using the power supply device through the power supply module;

S107: the acquired original monitoring data messages of the landslide mass, monitoring data set of the landslide mass, displacement change of the landslide mass, stability evaluation information of the landslide mass and abnormality early warning notification information are stored by using the cloud database server through the data storage module; and S108: the real-time data of the acquired original monitoring data messages of the landslide mass, monitoring data set of the landslide mass, displacement change of the landslide mass, stability evaluation information of the landslide mass and abnormality early warning notification information is updated and displayed by using the display through the display update module.

As shown in FIG. 3, the process of acquiring weather condition data by using the wireless data transceiver through the communication module to complete rainfall regularity analysis in S103 provided by an embodiment of the present disclosure includes:

S201: landslide displacement and groundwater level monitoring data under different intensities of rainfall is acquired;

S202: a rainfall-groundwater level-landslide displacement curve is drawn according to the landslide displacement and groundwater level monitoring data under different intensities of rainfall; and S203: rainfall regularity analysis is completed according to the rainfall-groundwater level-landslide displacement curve.

Said drawing a rainfall-groundwater level-landslide displacement curve according to the landslide displacement and groundwater level monitoring data under different intensities of rainfall in S202 provided by the embodiment of the present disclosure includes:

$$R = \frac{\sum_{i=1}^{n}(\omega_{t+1} - \omega_t)/\max(\Delta\omega)}{\sum_{i=1}^{n}(s_{t+1} - s_t)/\max(\Delta s)};$$

where R represents a local correlation coefficient between a rainfall curve and a landslide displacement, $\omega_{t+1}-\omega_t$ represents a rainfall from moment t to moment t+1, $s_{t+1}-s_t$ represents a landslide displacement from moment t to moment t+1, $\max(\Delta\omega)$ and $\max(\Delta s)$ represent the maximum amplitudes of rainfall and landslide displacement factors per unit time in a time period, and the closer the R is to 1, the stronger the correlation between the rainfall and the landslide displacement, thereby completing the rainfall regularity analysis.

The process of sending the preprocessed monitoring data set of the landslide mass to the CPU by using the wireless data transceiver through the communication module in S103 provided by the embodiment of the present disclosure includes:

(1) a data transmission success probability is calculated, where a theoretical calculation value of a one-time transmission success rate $P_N$ of a long message with a length of N Beidou data packets is as follows:

$$P_N = \bar{p} \cdot N;$$

where $\bar{p}$ represents a transmission success rate of Beidou data packets, which is defined as follows:

$$\bar{p} = \frac{R_{\mathit{eff}}}{S_{\mathit{eff}}};$$

where $S_{\mathit{eff}}$ represents a total number of valid Beidou data packets sent, and $R_{\mathit{eff}}$ represents a total number of valid Beidou data packets received; and (2) a data transmission delay is calculated, where an average transmission delay of Beidou short message communication is calculated by the following formula:

$$\bar{\tau} = \frac{1}{n}\sum_{i=1}^{n}(T_2^i - T_1^i);$$

where n represents a total number of Beidou data packets received and sent in a centralized manner, $T_1^i$ represents a sending time of an ith Beidou data packet, and $T_2^i$ represents a receiving time of the ith Beidou data packet.

As shown in FIG. 4, the process of coordinately controlling the normal operation of each module of the multi-state triggered system for remote automatic monitoring and early warning of a landslide mass by using the dual-core controller based on a DSP and an FPGA through the central control module in S104 provided by the embodiment of the present disclosure includes:

S301: an instruction is sent to an auxiliary processor FPGA through a main processor DSP;

S302: communication is performed with an A/D chip through the auxiliary processor FPGA to read in a test signal;

S303: the read-in test signal is processed through the auxiliary processor FPGA, and the processed test signal is transmitted to the DSP; and S304: a corresponding control method is acquired according to the processed test signal through the main processor DSP, so as to coordinately control the system for remote automatic monitoring and early warning of a landslide mass.

As shown in FIG. 5, the process of monitoring the displacement change of the landslide mass in real time by using the displacement monitoring device through the displacement monitoring module in S105 provided by the embodiment of the present disclosure includes:

S401: the change of inclination angles of panels of the displacement monitoring device is automatically monitored through an inclination angle sensor mounted on the displacement monitoring device;

S402: horizontal displacements of a vertical reflection panel and an inclined reflection panel are monitored in real time through a laser displacement sensor mounted on the displacement monitoring device; and S403: a moving orientation and velocity of the landslide mass are determined according to the change of the displacements and the inclination angles.

In S401 provided by the embodiment of the present disclosure, the panels of the displacement monitoring device include the inclined reflection panel and the vertical reflection panel which form an included angle $\alpha$ therebetween, the laser displacement sensor is directly opposite to the vertical reflection panel, the laser sensor and a horizontal direction form an included angle $\beta$ therebetween, and $\beta$ and $\alpha$ are supplementary angles to each other.

In S403 provided by the embodiment of the present disclosure, the process of determining a moving orientation and velocity of the landslide mass according to the change of the displacements and the inclination angles includes:

assuming that at the beginning and end of a monitoring time period, horizontal inclination angles monitored by the inclination angle sensor are $\alpha_0$ and $\alpha_1$ respectively, horizontal displacements of the vertical reflection panel are $\kappa_0$ and $\kappa_1$ respectively, and displacements of the inclined reflection panel are $d_0$ and $d_1$ respectively, a three-dimensional coordinate system is established by taking a laser spot on the inclined reflection panel at the beginning of the time period as an original point, taking a horizontal direction of an axis of the landslide mass as an x axis, taking a vertical direction as a y axis, and taking a direction perpendicular to the x axis and the y axis as a z axis, where the landslide mass along a monitoring direction of the landslide axis has a displacement d, and the landslide mass at a monitoring point has a horizontal displacement $d_x$, a vertical displacement $d_y$, and a lateral displacement $d_z$;

in a plane coordinate system composed of the x axis and the y axis, when $\alpha_0 = \alpha_1$, the inclined reflection panel moves in parallel, the laser spot starts from the original point and moves from bottom to top along a straight line on the inclined reflection panel, at the end of the time period, the laser spot is located at $B(x_1,y_1)$, and the location point of the laser spot at the beginning of the time period moves to $A(x_0,y_0)$;

(1) on the axis of the landslide mas, a landslide displacement in an inclined monitoring direction is:

$$d = d_1 - d_0;$$

(2) at the monitoring point, a horizontal displacement is calculated as:

$$d_x = \kappa_1 - \kappa_0;$$

(3) a vertical displacement is calculated as:

$$x_1 = d \cos \beta x_0 = d_x;$$

$$y_1 = d \sin \beta tg(\pi/2-\beta) = (y_0-y_1)/(x_0-x_1);$$

$$y_0 = y_1 + (x_0-x_1)tg(\pi/2-\beta);$$

$$y_0 = d \sin \beta + (d_x - d \cos \beta)tg(\pi/2-\beta);$$

that is, $d_y = d \sin \beta + (d_x - d \cos \beta)tg(\pi/2-\beta)$; and (4) a lateral displacement is calculated as:

in a plane coordinate system composed of the z axis and the y axis, on a lateral reflection panel, a laser spot moves from bottom to top along a straight line, at the end of the time period, the laser spot is located at $B(z_1,y_1)$, and the location point of the laser spot at the beginning of the time period moves to $A(z_0,y_0)$; in this way, assuming that a distance difference between 2 adjacent times of measurement in a lateral direction is dd, then:

$$z_1 = dd \cos \Phi;$$

$$y_1 = d \sin \beta tg(\pi/2-\Phi) = (y_0-y_1)/(z_0-z_1);$$

$$z_0 - z_1 = (y_0-y_1)/tg(\pi/2-\Phi);$$

$$z_0 = (y_0-y_1)/tg(\pi/2-\Phi) + z_1;$$

that is, $d_z = (d_y - dd \sin \Phi)/tg(\pi/2-\Phi) + dd \cos \Phi$.

As shown in FIG. 6, the multi-state triggered system for remote automatic monitoring and early warning of a landslide mass provided by embodiment 2 of the present disclosure includes: a landslide mass monitoring device 501, a displacement monitoring device 505, a communication device 503, a central control device 504, an abnormality early warning device 507, a power supply device 508, a data storage device 509, and a display update device 510.

The landslide mass monitoring device 501 includes monitors such as a rain gauge, and is connected with the central control device 504. The landslide mass monitoring device 501 is configured to monitor the landslide mass in real time through the monitors and acquire original monitoring data including rainfall of the landslide mass.

The displacement monitoring device 505 is connected with the central control device 504, and is configured to monitor a displacement change of the landslide mass in real time and acquire original displacement data of the landslide mass. The displacement monitoring device 505 includes a inclined reflection panel, a vertical reflection panel, a inclination angle sensor, and a laser displacement sensor. The inclination angle sensor is configured to automatically monitor change of inclination angles of the inclined reflection panel and the vertical reflection panel; and the laser displacement sensor is configured to monitor horizontal displacements of the vertical reflection panel and the inclined reflection panel. The inclined reflection panel is arranged at an angle $\alpha$ with respect to the vertical reflection panel. The laser displacement sensor is directly opposite to the vertical relection panel. The laser displacement sensor is arranged at an angle $\beta$ with respect to a horizontal direction, and $\beta$ and $\alpha$ are supplementary angles to each other.

The displacement monitoring device 505 determines a moving orientation and velocity of the landslide mass according to changes of the displacements and the inclination angles. Specifically, it is assumed that at the beginning and end of a monitoring time period, horizontal inclination angles monitored by the inclination angle sensor are $\alpha_0$ and $\alpha_1$ respectively, horizontal displacements of the vertical reflection panel are assumed as $\kappa_0$ and $\kappa_1$ respectively, and horizontal displacements of the inclined reflection panel are assumed as $d_0$ and $d_1$ respectively. A three-dimensional coordinate system is established by setting a laser spot on the inclined reflection panel at a beginning of the time period as an original point. A horizontal direction of an axis of the landslide mass is taken as an x axis. A vertical direction is taken as a y axis. A direction perpendicular to the x axis and the y axis is taken as a z axis. The landslide mass along a monitoring direction of the landslide axis has a displacement d. The landslide mass at a monitoring point has a horizontal displacement $d_x$, a vertical displacement $d_y$, and a lateral displacement $d_z$.

In a plane coordinate system composed of the x axis and the y axis, when $\alpha_0 = \alpha_1$, the inclined reflection panel moves in parallel. The laser spot starts from the original point and moves from bottom to top along a straight line on the inclined reflection panel. At an end of the time period, the laser spot is located at $B(x_1,y_1)$, and the location point of the laser spot at the beginning of the time period moves to $A(x_0,y_0)$.

(1) On the axis of the landslide mass, a displacement of the landslide mass in a monitoring direction is:

$$d = d_1 - d_0.$$

(2) At the monitoring point, a horizontal displacement is calculated as:

$$d_x = \kappa_1 - \kappa_0.$$

(3) At the monitoring point, a vertical displacement is calculated by following equations:

$$x_1 = d \cos \beta \; x_0 = d_x;$$

$$y_1 = d \sin \beta \, tg(\pi/2 - \beta) = (y_0 - y_1)/(x_0 - x_1);$$

$$y_0 = y_1 + (x_0 - x_1) tg(\pi/2 - \beta);$$

$$y_0 = d \sin \beta + (d_x - d \cos \beta) tg(\pi/2 - \beta);$$

that is, $d_y = d \sin \beta + (d_x - d \cos \beta) tg(\pi/2 - \beta)$.

(4) At the monitoring point, a lateral displacement is calculated by following steps.

In a plane coordinate system composed of the z axis and the y axis, on a lateral reflection panel, a laser spot moves from bottom to top along a straight line. At the end of the time period, the laser spot is located at $B(z_1,y_1)$, and the location point of the laser spot at the beginning of the time period moves to $A(z_0,y_0)$.

In this way, a distance difference between 2 adjacent times of measurement in a lateral direction is assumed as dd, then:

$$z_1 = dd \cos \Phi;$$

$$y_1 = d \sin \beta \, tg(\pi/2 - \Phi) = (y_0 - y_1)/(z_0 - z_1);$$

$$z_0 - z_1 = (y_0 - y_1)/tg(\pi/2 - \Phi);$$

$$z_0 = (y_0 - y_1)/tg(\pi/2 - \Phi) + z_1;$$

that is, $d_z = (d_y - dd \sin \Phi)/tg(\pi/2 - \Phi) + dd \cos \Phi$.

The communication device 503 is connected with the central control device 504, and is configured to send the original monitoring data of the landslide mass and the original displacement data of the landslide mass to the central control device 504.

The communication device 503 is further configured to perform the following operations.

(1) A data transmission success probability is calculated. A theoretical calculation value of a one-time transmission success rate $P_N$ of a long message with a length of N Beidou data packets is as follows:

$$P_N = \bar{p} \cdot N;$$

where $\bar{p}$ represents a transmission success rate of Beidou data packets, which is defined as follows:

$$\bar{p} = \frac{R_{eff}}{S_{eff}};$$

where $S_{eff}$ represents a total number of valid Beidou data packets sent, and $R_{eff}$ represents a total number of valid Beidou data packets received.

(2) A data transmission delay is calculated. An average transmission delay of Beidou short message communication is calculated by the following equation:

$$\bar{\tau} = \frac{1}{n} \sum_{i=1}^{n} (T_2^i - T_1^i);$$

where n represents a total number of Beidou data packets received and sent in a centralized manner, $T_1^1$ represents a sending time of an ith Beidou data packet, and $T_2^i$ represents a receiving time of the ith Beidou data packet.

A reliability test of data transmission system can be realized according to the data transmission success probability and the data transmission delay, and in combination with the matching probability of the data collected on site at a landslide monitoring point and the data received by a monitoring center.

The abnormality early warning device 507 includes a audible and visual alarm, and is connected with the central control device 504, and is configured to perform early warning notification for an abnormal displacement change of the landslide mass through the audible and visual alarm.

The power supply device 508 is connected with the central control device 504, and is configured to supply power for the multi-state triggered system for remote automatic monitoring and early warning of a landslide mass.

The data storage device 509 is connected with the central control device 504, and is configured to store the original monitoring data of the landslide mass, the original displacement data of the landslide mass, the preprocessed monitoring data of the landslide mass, the preprocessed displacement data of the landslide mass, stability evaluation information of the landslide mass, abnormality early warning notification information, the data preprocessing program and the stability evaluation program acquired through a cloud database server.

The display update device 510 includes displayer and is connected with the central control device 504. The display update device 510 is configured to update and display the real-time data of the acquired original monitoring data of the landslide mass, the preprocessed monitoring data of the landslide mass, displacement change of the landslide mass, preprocessed displacement data of the landslide mass, stability evaluation information of the landslide mass and abnormality early warning notification through a display.

The central control device 504 includes a dual-core controller based on a digital signal processor (DSP) and a field programmable gate array (FPGA), and is connected with the landslide mass monitoring device 501, the communication device 503, the displacement monitoring device 505, the abnormality early warning device 507, the power supply device 508, the data storage device 509 and the display update device 510. The central control device 504 is configured to coordinately control normal operations of each device of the multi-state triggered system 500 for remote automatic monitoring and early warning of a landslide mass through a dual-core controller based on a digital signal processor (DSP) and a field programmable gate array (FPGA). The dual-core controller based on a DSP and a FPGA executes a data preprocessing program and a stability evaluation program stored in the data storage device 509 to perform a data preprocessing S502 and a stability evaluation processing S506.

The data preprocessing S502 is used for preprocessing the acquired original monitoring data of the landslide mass and the acquired original displacement data of the landslide mass.

The stability evaluation processing S506 is used for evaluating a stability of the landslide mass according to the preprocessed monitoring data of the landslide mass and the preprocessed displacement data of the landslide mass.

Specifically, the stability evaluation processing S506 includes step S5061 and step S5062. In step S5061, a rainfall-landslide displacement curve is drawn according to the preprocessed monitoring data of the landslide mass and the preprocessed displacement data of the landslide mass. In step S5062, a stability evaluation processing is performed according to the rainfall-landslide displacement curve.

In the stability evaluation processing S506, the rainfall-landslide displacement curve is drawn according to the preprocessed monitoring data of the landslide mass and the preprocessed displacement data of the landslide mass, to obtain a local correlation coefficient between a rainfall curve and a landslide displacement:

$$R = \frac{\sum_{t=1}^{n}(\omega_{t+1} - \omega_t)/\max(\Delta\omega)}{\sum_{t=1}^{n}(s_{t+1} - s_t)/\max(\Delta s)};$$

where R represents a local correlation coefficient between a rainfall curve and a landslide displacement, $\omega_{t+1}-\omega_t$ represents a rainfall from moment t to moment t+1, $s_{t+1}-s_t$ represents a landslide displacement from moment t to moment t+1, $\max(\Delta\omega)$ and $\max(\Delta s)$ represent maximum amplitudes of rainfall and landslide displacement factors per unit time in a time period. In the stability evaluation processing, as the R approaches 1, the correlation between the rainfall and the landslide displacement become tight, that is the stability of the landslide mass gets worse.

Preferably, when β is equal to 1, the abnormality early warning device 507 is started under a control of the central control device 504, to perform an early warning notification.

In the description of the present disclosure, unless otherwise indicated, "a plurality of" means two or more; orientations or position relationships indicated by the terms "upper", "lower", "left", "right", "inner", "outer", "front end", "rear end", "head", "tail", etc. are orientations or position relationships as shown in the drawings, and these terms are just used to facilitate description of the present disclosure and simplify the description, but not to indicate or imply that the mentioned apparatus or elements must have a specific orientation and must be established and operated in a specific orientation, and thus, these terms cannot be understood as a limitation to the present disclosure. Moreover, the terms "first", "second" and "third" are used only for description, rather than to indicate or imply relative importance.

Some or all of the functions in the foregoing embodiments may be implemented by software, hardware, firmware, or any combination thereof. When implemented in the form of a computer program product in whole or part, the computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid state disk (SSD), or the like.

The foregoing are merely descriptions of the specific embodiments of the present disclosure, and the protection scope of the present disclosure is not limited thereto. Any modification, equivalent replacement, improvement, etc. made within the technical scope of the present disclosure by a person skilled in the art according to the spirit and principle of the present disclosure shall fall within the protection scope of the present disclosure.

What is claimed is:

1. A multi-state triggered system for remote automatic monitoring and early warning of a landslide mass, comprising:
   a landslide mass monitoring module connected with a central control module, and configured to monitor the landslide mass in real time through two sets of monitoring devices arranged crosswise at an angle of 90 degrees, and acquire original monitoring data messages of the landslide mass;
   a data preprocessing module connected with the central control module, and configured to preprocess the acquired original monitoring data messages of the landslide mass through a data preprocessing program, and acquire a monitoring data set of the landslide mass;
   a communication module connected with the central control module, and configured to acquire weather condition data through a wireless data transceiver to complete rainfall regularity analysis, and send the preprocessed monitoring data set of the landslide mass to a central processing unit (CPU);
   the central control module connected with the landslide mass monitoring module, the data preprocessing module, the communication module, a displacement monitoring module, a stability evaluation module, an abnormality early warning module, a power supply module, a data storage module and a display update module, and configured to coordinately control the normal operation of each module of the multi-state triggered system for remote automatic monitoring and early warning of a landslide mass through a dual-core controller based on a digital signal processor (DSP) and a field programmable gate array (FPGA);

the displacement monitoring module connected with the central control module, and configured to monitor the displacement change of the landslide mass in real time through a displacement monitoring device;

the stability evaluation module connected with the central control module, and configured to evaluate the stability of the landslide mass according to the displacement change of the landslide mass through a stability evaluation program;

the abnormality early warning module connected with the central control module, and configured to perform early warning notification for an abnormal displacement change of the landslide mass through an acoustic-optical early warning device;

the power supply module connected with the central control module, and configured to supply power for the multi-state triggered system for remote automatic monitoring and early warning of a landslide mass through a power supply device;

the data storage module connected with the central control module, and configured to store the acquired original monitoring data messages of the landslide mass, monitoring data set of the landslide mass, displacement change of the landslide mass, stability evaluation information of the landslide mass and abnormality early warning notification information through a cloud database server; and the display update module connected with the central control module, and configured to update and display the real-time data of the acquired original monitoring data messages of the landslide mass, monitoring data set of the landslide mass, displacement change of the landslide mass, stability evaluation information of the landslide mass and abnormality early warning notification information through a display.

2. The multi-state triggered system for remote automatic monitoring and early warning of a landslide mass according to claim 1, wherein the process of acquiring the weather condition data through the wireless data transceiver to complete rainfall regularity analysis in the communication module specifically comprises:

(1) acquiring landslide displacement and groundwater level monitoring data under different intensities of rainfall;

(2) drawing a rainfall-groundwater level-landslide displacement curve according to the landslide displacement and groundwater level monitoring data under different intensities of rainfall; and (3) completing rainfall regularity analysis according to the rainfall-groundwater level-landslide displacement curve.

3. The multi-state triggered system for remote automatic monitoring and early warning of a landslide mass according to claim 2, wherein said drawing a rainfall-groundwater level-landslide displacement curve according to the landslide displacement and groundwater level monitoring data under different intensities of rainfall comprises:

$$R = \frac{\sum_{t=1}^{n}(\omega_{t+1}-\omega_t)/\max(\Delta\omega)}{\sum_{t=1}^{n}(s_{t+1}-s_t)/\max(\Delta s)};$$

wherein R represents a local correlation coefficient between a rainfall curve and a landslide displacement, $\omega_{t+1}-\omega_t$ represents a rainfall from moment t to moment t+1, $s_{t+1}-s_t$ represents a landslide displacement from moment t to moment t+1, $\max(\Delta\omega)$ and $\max(\Delta s)$ represent the maximum amplitudes of rainfall and landslide displacement factors per unit time in a time period, and the closer the R is to 1, the stronger the correlation between the rainfall and the landslide displacement, thereby completing the rainfall regularity analysis.

4. The multi-state triggered system for remote automatic monitoring and early warning of a landslide mass according to claim 1, wherein the process of sending the preprocessed monitoring data set of the landslide mass to the CPU through the wireless data transceiver in the communication module comprises:

(1) calculating a data transmission success probability, wherein a theoretical calculation value of a one-time transmission success rate $P_N$ of a long message with a length of N Beidou data packets is as follows:

$$P_N = \bar{p} \cdot N;$$

wherein $\bar{p}$ represents a transmission success rate of Beidou data packets, which is defined as follows:

$$\bar{p} = \frac{R_{\mathit{eff}}}{S_{\mathit{eff}}};$$

wherein $S_{\mathit{eff}}$ represents a total number of valid Beidou data packets sent, and $R_{\mathit{eff}}$ represents a total number of valid Beidou data packets received; and (2) calculating a data transmission delay, wherein an average transmission delay of Beidou short message communication is calculated by the following formula:

$$\bar{\tau} = \frac{1}{n}\sum_{i=1}^{n}(T_2^i - T_1^i);$$

wherein n represents a total number of Beidou data packets received and sent in a centralized manner, $T_1^i$ represents a sending time of an ith Beidou data packet, and $T_2^i$ represents a receiving time of the ith Beidou data packet.

5. The multi-state triggered system for remote automatic monitoring and early warning of a landslide mass according to claim 1, wherein the process of coordinately controlling the normal operation of each module of the multi-state triggered system for remote automatic monitoring and early warning of a landslide mass through a dual-core controller based on a DSP and an FPGA in the central control module comprises:

(1) sending an instruction to an auxiliary processor FPGA through a main processor DSP;

(2) performing communication with an analog to digital (A/D) chip through the auxiliary processor FPGA to read in a test signal;

(3) processing the read-in test signal through the auxiliary processor FPGA, and transmitting the processed test signal to the DSP; and (4) acquiring a corresponding control method according to the processed test signal through the main processor DSP, so as to coordinately control the system for remote automatic monitoring and early warning of a landslide mass.

6. The multi-state triggered system for remote automatic monitoring and early warning of a landslide mass according to claim 1, wherein the process of monitoring the displacement change of the landslide mass in real time through a displacement monitoring device in the displacement monitoring module comprises:
   (1) automatically monitoring the change of inclination angles of panels of the displacement monitoring device through an inclination angle sensor mounted on the displacement monitoring device;
   (2) monitoring horizontal displacements of a vertical reflection panel and an inclined reflection panel in real time through a laser displacement sensor mounted on the displacement monitoring device; and
   (3) determining a moving orientation and velocity of the landslide mass according to the change of the displacements and the inclination angles.

7. The multi-state triggered system for remote automatic monitoring and early warning of a landslide mass according to claim 6, wherein the panels of the displacement monitoring device comprise the inclined reflection panel and the vertical reflection panel which form an included angle α therebetween, the laser displacement sensor is directly opposite to the vertical reflection panel, the laser sensor and a horizontal direction form an included angle β therebetween, and β and α are supplementary angles to each other.

8. The multi-state triggered system for remote automatic monitoring and early warning of a landslide mass according to claim 6, wherein the process of determining a moving orientation and velocity of the landslide mass according to the change of the displacements and the inclination angles comprises:
   assuming that at the beginning and end of a monitoring time period, horizontal inclination angles monitored by the inclination angle sensor are $α_0$ and $α_1$ respectively, horizontal displacements of the vertical reflection panel are $κ_0$ and $κ_1$ respectively, and displacements of the inclined reflection panel are $d_0$ and $d_1$ respectively, establishing a three-dimensional coordinate system by taking a laser spot on the inclined reflection panel at the beginning of the time period as an original point, taking a horizontal direction of an axis of the landslide mass as an x axis, taking a vertical direction as a y axis, and taking a direction perpendicular to the x axis and the y axis as a z axis, wherein the landslide mass along a monitoring direction of the landslide axis has a displacement d, and the landslide mass at a monitoring point has a horizontal displacement $d_x$, a vertical displacement $d_y$, and a lateral displacement $d_z$;
   in a plane coordinate system composed of the x axis and the y axis, when $α_0=α_1$, the inclined reflection panel moves in parallel, the laser spot starts from the original point and moves from bottom to top along a straight line on the inclined reflection panel, at the end of the time period, the laser spot is located at $B(x_1,y_1)$, and the location point of the laser spot at the beginning of the time period moves to $A(x_0,y_0)$;
   (1) on the axis of the landslide mass, a landslide displacement in an inclined monitoring direction is:

$d=d_1-d_0$;

(2) at the monitoring point, a horizontal displacement is calculated as:

$d_x=κ_1-κ_0$;

(3) a vertical displacement is calculated as:

$x_1=d \cos β x_0=d_x$;

$y_1=d \sin β tg(π/2-β)=(y_0-y_1)/(x_0-x_1)$;

$y_0=y_1+(x_0-x_1)tg(π/2-β)$;

$y_0=d \sin β+(d_x-d \cos β)tg(π/2-β)$;

that is, $d_y=d \sin β+(d_x-d \cos β)tg(π/2-β)$; and (4) a lateral displacement is calculated as:
   in a plane coordinate system composed of the z axis and the y axis, on a lateral reflection panel, a laser spot moves from bottom to top along a straight line, at the end of the time period, the laser spot is located at $B(z_1,y_1)$, and the location point of the laser spot at the beginning of the time period moves to $A(z_0,y_0)$; in this way,
   assuming that a distance difference between 2 adjacent times of measurement in a lateral direction is dd, then:

$z_1=dd \cos Φ$;

$y_1=d \sin β tg(π/2-Φ)=(y_0-y_1)/(z_0-z_1)$;

$z_0-z_1=(y_0-y_1)/tg(π/2-Φ)$;

$z_0=(y_0-y_1)/tg(π/2-Φ)+z_1$;

that is, $d_z=(d_y-dd \sin Φ)/tg(π/2-Φ)+dd \cos Φ$.

9. A non-transitory computer-readable storage medium in which an instruction is stored, wherein when the instruction is executed on a computer, the computer applies the multi-state triggered system for remote automatic monitoring and early warning of a landslide mass according to claim 1.

10. A multi-state triggered system for remote automatic monitoring and early warning of a landslide mass, comprising:
   a landslide mass monitoring device comprising a monitor with a rain gauge, wherein the landslide mass monitoring device is connected with a central control device, and is configured to monitor the landslide mass in real time and acquire original monitoring data of the landslide mass;
   a displacement monitoring device connected with the central control device, and configured to monitor a displacement change of the landslide mass in real time and acquire original displacement data of the landslide mass;
   a communication device connected with the central control device, and configured to send the original monitoring data of the landslide mass and the original displacement data of the landslide mass to the central control device;
   the central control device connected with the landslide mass monitoring device, the communication device, the displacement monitoring device, an abnormality early warning device, a power supply device, a data storage device and a display update device, and configured to coordinately control normal operations of various devices of the multi-state triggered system for remote automatic monitoring and early warning of a landslide mass through a dual-core controller based on a digital signal processor (DSP) and a field programmable gate array (FPGA), wherein the dual-core controller based on a DSP and a FPGA executes a data preprocessing program and a stability evaluation program to respectively perform:

a data preprocessing for preprocessing the acquired original monitoring data of the landslide mass and the acquired original displacement data of the landslide mass;

a stability evaluation processing for evaluating a stability of the landslide mass according to the preprocessed monitoring data of the landslide mass and the preprocessed displacement data of the landslide mass;

the abnormality early warning device comprising a audible and visual alarm and connected with the central control device, to perform early warning notification for an abnormal displacement change of the landslide mass;

the power supply device connected with the central control device, and configured to supply power for the multi-state triggered system for remote automatic monitoring and early warning of a landslide mass;

the data storage device connected with the central control device, and configured to store the data preprocessing program, the stability evaluation program, the original monitoring data of the landslide mass, the original displacement data of the landslide mass, the preprocessed monitoring data of the landslide mass, the preprocessed displacement data of the landslide mass, stability evaluation information of the landslide mass and abnormality early warning notification information acquired through a cloud database server; and the display update device comprising a display, connected with the central control device, and configured to update and display the acquired original monitoring data of the landslide mass, the preprocessed monitoring data of the landslide mass, displacement change of the landslide mass, preprocessed displacement data of the landslide mass, stability evaluation information of the landslide mass and abnormality early warning notification in real time through a display.

11. The multi-triggered system for remote automatic monitoring and early warning of a landslide mass according to claim 10, wherein the stability evaluation processing comprises:

drawing a rainfall-landslide displacement curve according to the preprocessed monitoring data of the landslide mass and the preprocessed displacement data of the landslide mass; and performing the stability evaluation processing according to the rainfall-landslide displacement curve.

12. The multi-triggered system for remote automatic monitoring and early warning of a landslide mass according to claim 11, wherein the drawing a rainfall-landslide displacement curve according to the preprocessed monitoring data of the landslide mass and the preprocessed displacement data of the landslide mass comprises:

$$R = \frac{\sum_{t=1}^{n}(\omega_{t+1} - \omega_t)/\max(\Delta\omega)}{\sum_{t=1}^{n}(s_{t+1} - s_t)/\max(\Delta s)};$$

wherein R represents a local correlation coefficient between a rainfall curve and a landslide displacement, $\omega_{t+1} - \omega_t$ represents a rainfall from moment t to moment t+1, $s_{t+1} - s_t$ represents a landslide displacement from moment t to moment t+1, $\max(\Delta\omega)$ and $\max(\Delta s)$ represent maximum amplitudes of rainfall and landslide displacement factors per unit time in a time period, in the stability evaluation processing, as R approaches 1, correlation between the rainfall and the landslide displacement becomes tight, and in turn the stability of the landslide mass gets worse.

13. The multi-triggered system for remote automatic monitoring and early warning of a landslide mass according to claim 12, wherein when R is equal to 1, the abnormality early warning device is started under control of the central control device, to perform an early warning notification.

14. The multi-triggered system for remote automatic monitoring and early warning of a landslide mass according to claim 10, wherein the communication device is further configured for:

(1) calculating a data transmission success probability, wherein a theoretical calculation value of a one-time transmission success rate $P_N$ of a long message with a length of N Beidou data packets is as follows:

$$P_N = \bar{p} \cdot N;$$

wherein $\bar{p}$ represents a transmission success rate of Beidou data packets, which is defined as follows:

$$\bar{p} = \frac{R_{\mathit{eff}}}{S_{\mathit{eff}}};$$

wherein $S_{\mathit{eff}}$ represents a total number of valid Beidou data packets sent, and $R_{\mathit{eff}}$ represents a total number of valid Beidou data packets received; and (2) calculating a data transmission delay, wherein an average transmission delay of Beidou short message communication is calculated by the following formula:

$$\bar{\tau} = \frac{1}{n}\sum_{i=1}^{n}(T_2^i - T_1^i);$$

wherein n represents a total number of Beidou data packets received and sent in a centralized manner, $T_1^i$ represents a sending time of an ith Beidou data packet, and $T_2^i$ represents a receiving time of the ith Beidou data packet.

15. The multi-triggered system for remote automatic monitoring and early warning of a landslide mass according to claim 10, wherein the displacement monitoring device comprises a inclined reflection panel, a vertical reflection panel, a inclination angle sensor, and a laser displacement sensor, the inclination angle sensor is configured to automatically monitor change of inclination angles of the inclined reflection panel and the vertical reflection panel; and the laser displacement sensor is configured to monitor horizontal displacements of the vertical reflection panel and the inclined reflection panel.

16. The multi-triggered system for remote automatic monitoring and early warning of a landslide mass according to claim 15, wherein the inclined reflection panel is arranged at an included angle α is arranged at an included angle α with respect to the vertical reflection panel, the laser displacement sensor is directly opposite to the vertical reflection panel, the laser displacement sensor is arranged at an included angle β with respect to a horizontal direction, and β and α are supplementary angles to each other.

17. The multi-triggered system for remote automatic monitoring and early warning of a landslide mass according to claim 15, wherein the displacement monitoring device is configured to determine a moving orientation and velocity of the landslide mass according to changes of the displacements and the inclination angles, comprises:

assuming that at a beginning and end of a monitoring time period, horizontal inclination angles monitored by the inclination angle sensor are $\alpha_0$ and $\alpha_1$ respectively, horizontal displacements of the vertical reflection panel are $\kappa_0$ and $\kappa_1$ respectively, and horizontal displacements of the inclined reflection panel are $d_0$ and $d_1$ respectively, establishing a three-dimensional coordinate system by setting a laser spot on the inclined reflection panel at a beginning of the time period as an original point, setting a horizontal direction of an axis of the landslide mass as an x axis, setting a vertical direction as a y axis, and setting a direction perpendicular to the x axis and the y axis as a z axis, wherein the landslide mass along a monitoring direction of the landslide axis has a displacement d, and the landslide mass at a monitoring point has a horizontal displacement $d_x$, a vertical displacement $d_y$, and a lateral displacement $d_z$;

in a plane coordinate system composed of the x axis and the y axis, when $\alpha_0 = \alpha_1$, the inclined reflection panel moves in parallel, the laser spot starts from the original point and moves from bottom to top along a straight line on the inclined reflection panel, at an end of the time period, the laser spot is located at $B(x_1, y_1)$, and the location point of the laser spot at the beginning of the time period moves to $A(x_0, y_0)$;

(1) on the axis of the landslide mass, a displacement of the landslide mass in a monitoring direction is:

$$d = d_1 - d_0;$$

(2) at the monitoring point, a horizontal displacement is calculated as:

$$d_x = \kappa_1 - \kappa_0;$$

(3) at the monitoring point, a vertical displacement is calculated by following equations:

$$x_1 = d \cos \beta, x_0 = d_x;$$

$$y_1 = d \sin \beta, tg(\pi/2 - \beta) = (y_0 - y_1)/(x_0 - x_1);$$

$$y_0 = y_1 + (x_0 - x_1) tg(\pi/2 - \beta);$$

$$y_0 = d \sin \beta + (d_x - d \cos \beta) tg(\pi/2 - \beta);$$

that is, $d_y = d \sin \beta + (d_x - d \cos \beta) tg(\pi/2 - \beta)$; and (4) at the monitoring point, a lateral displacement is calculated by following steps:

in a plane coordinate system composed of the z axis and the y axis, on a lateral reflection panel, a laser spot moves from bottom to top along a straight line, at the end of the time period, the laser spot is located at $B(z_1, y_1)$, and the location point of the laser spot at the beginning of the time period moves to $A(z_0, y_0)$; in this way, assuming that a distance difference between 2 adjacent times of measurement in a lateral direction is dd, then:

$$z_1 = dd \cos \Phi;$$

$$y_1 = d \sin \beta, tg(\pi/2 - \Phi) = (y_0 - y_1)/(z_0 - z_1);$$

$$z_0 - z_1 = (y_0 - y_1)/tg(\pi/2 - \Phi);$$

$$z_0 = (y_0 - y_1)/tg(\pi/2 - \Phi) + z_1;$$

that is, $d_z = (d_y - dd \sin \Phi)/tg(\pi/2 - \Phi) + dd \cos \Phi$.

* * * * *